March 10, 1970 S. W. KERSHNER ET AL 3,500,004
SWITCH PLUNGER OPERATING MECHANISM WITH MICROSWITCH ACTUATING
CAM ROLLERS AND LOST MOTION MEANS
Filed April 4, 1967 5 Sheets-Sheet 1

INVENTORS
STEPHEN W. KERSHNER
KENNETH OWEN
BY Milford A. Juten

ATTORNEY

INVENTORS
STEPHEN W. KERSHNER
KENNETH OWEN

BY *Milford A. Juston*
ATTORNEY

INVENTOR.
STEPHEN W. KERSHNER
BY KENNETH OWEN

ATTORNEY

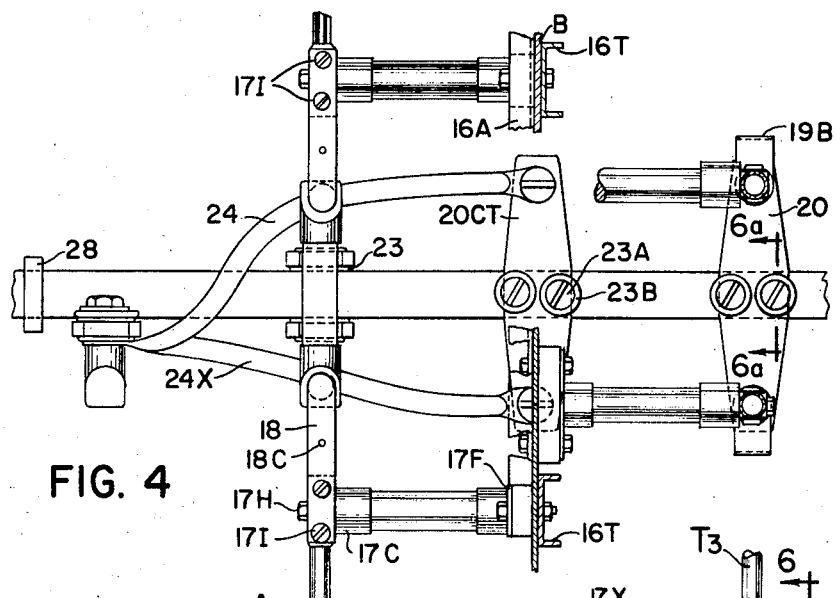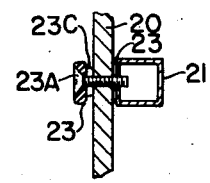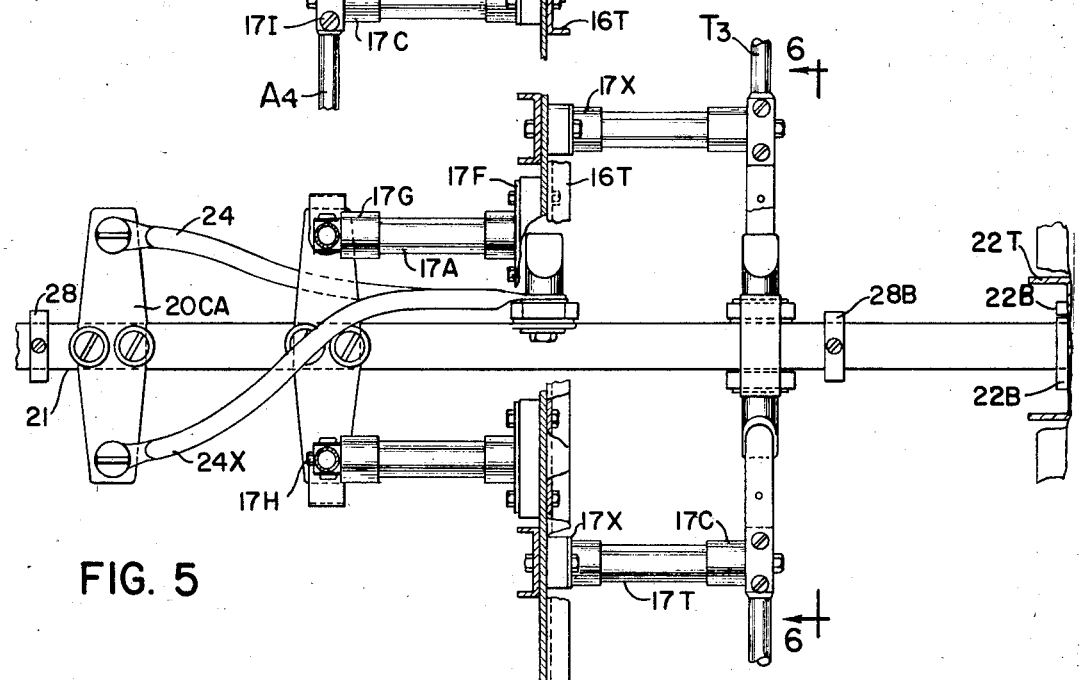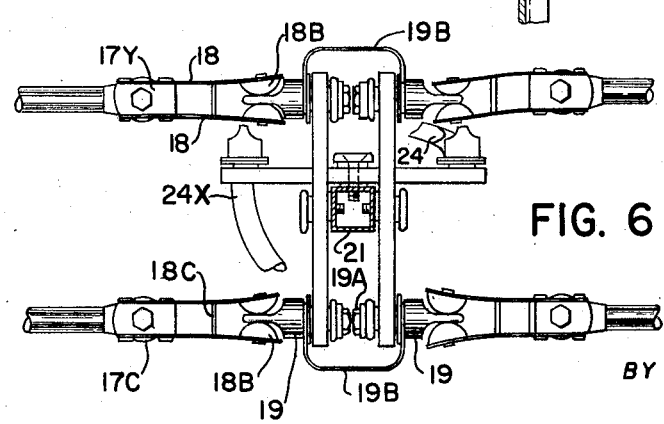

INVENTORS
STEPHEN W. KERSHNER
KENNETH OWEN

BY

ATTORNEY

United States Patent Office 3,500,004
Patented Mar. 10, 1970

3,500,004
SWITCH PLUNGER OPERATING MECHANISM WITH MICROSWITCH ACTUATING CAM ROLLERS AND LOST MOTION MEANS
Stephen W. Kershner, Falls Church, and Kenneth Owen, Springfield, Va.; said Owen assignor to Delta Electronics, Inc., Alexandria, Va.
Filed Apr. 4, 1967, Ser. No. 628,501
Int. Cl. H01h 3/32
U.S. Cl. 200—18                                          5 Claims

ABSTRACT OF THE DISCLOSURE

A switch system using a plurality of multi-contact reciprocating switch plungers to selectively connect any one of a plurality of multi-conductor lines running in one direction to any one of a plurality of multi-conductor lines running in a transverse direction with each plunger switch unit and its cooperating contacts being made in a module whereby a switch system of any number of switches can be readily assembled, particularly for the purpose of connecting any one of a plurality of transmitters to any one of a plurality of directional antennas for directing radio waves in a particular direction as required. Rotatable cranks, with lost motion means and microswitch actuating cam rollers, reciprocably operate the switch plungers.

The present invention relates to electrical switching of relatively large power supplies and loads and more particularly to selectively switching from any one source of power to any one of a plurality of loads for radio broadcasting including balanced line and single conductor switching.

Heretofore various switch systems have been provided including that shown in Patent 3,223,812 of Wright and Owen which relates to switching of coaxial lines.

An object of the present invention is to provide a switch system for selectively connecting any one of a plurality of multi-conductor power lines to any one of a plurality of transversely arranged multi-conductor load lines spaced therefrom.

Another object is to provide an operating means for suitably operating a switch plunger to selectively connect any one of a plurality of multi-conductor power lines to any one of a plurality of multi-conductor load lines.

Other and further objects will be apparent as the description proceeds and upon reference to the accompanying drawings wherein:

FIGURE 4 is a plan view of the switch of FIGURE 3.

FIGURE 5 is an elevation of the switch shown in FIGURES 3 and 4.

FIGURE 6 is a rear view taken substantially on line 6—6 of the same switch with parts broken away and the forward parts omitted showing the adaptability of the contacts to variations in alignment.

FIGURE 6A is a fragmentary detail of the means securing a contact carrying insulator to the reciprocating shaft with a corona ring to minimize corona discharge.

Figure 1:
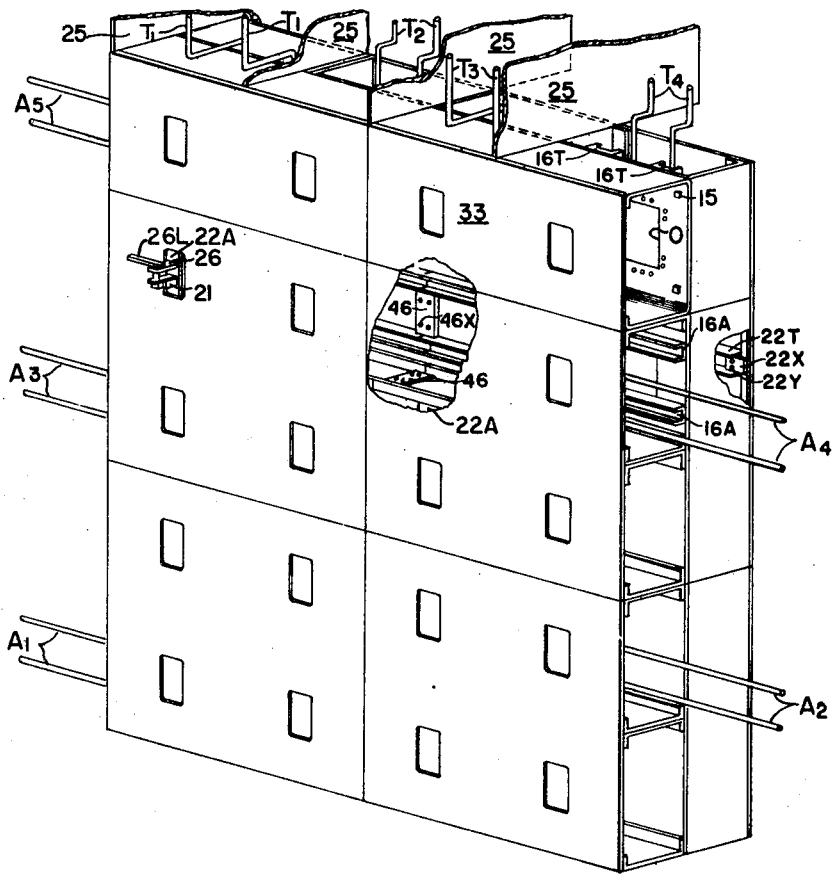
FIGURE 1 is an isometric view of a switch system built up of a plurality of modules shown and described in a vertical position for convenience of illustration and adapted for horizontal mounting above the heads of the technicians.
Figure 12:
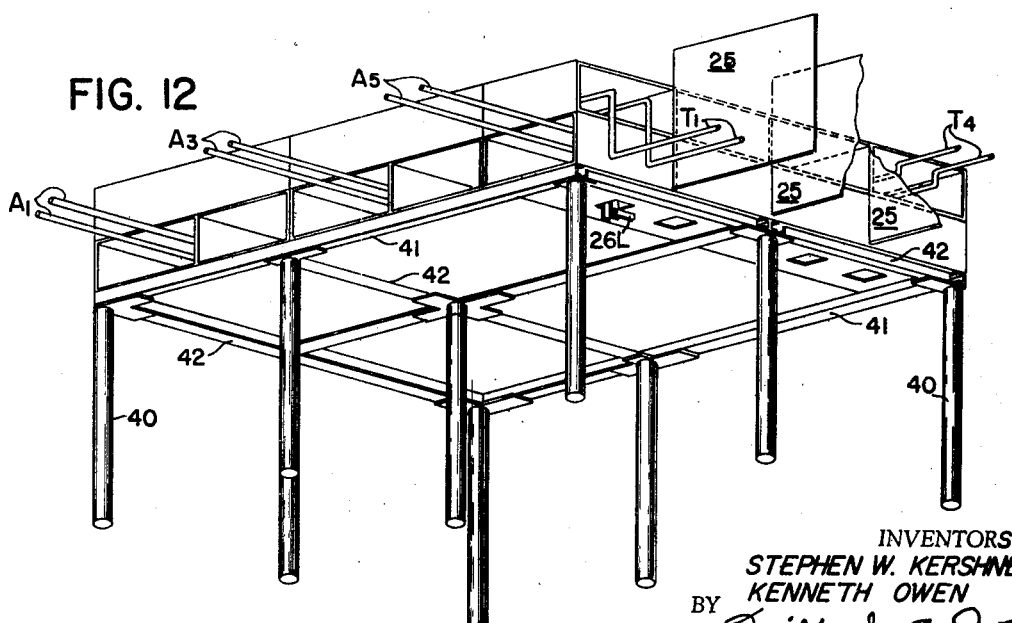
FIGURE 12 is a perspective of the switch system supported overhead by suitable posts, beams and stringers.

Referring more particularly to FIGURE 1, a plurality of multi-conductor lines A1, A2, A3, A4 and A5 shown as extending horizontally are adapted to be connected to corresponding antennas and multi-conductor lines T1, T2, T3, and T4 are shown as extending vertically and adapted to be connected to corresponding transmitters. Although the figure illustrates the switch assembly in upright position, it is preferably mounted in a horizontal position, such as being suspended from a ceiling or supported on posts by suitable beams as shown in FIG. 12 and with the operating handles beneath so the technicians can have easy access and observation of the condition of each plunger switch unit while providing a switching system of unlimited size and combinations.

Referring particularly to FIGURES 1 through 6 inclusive the switching system is made up of a number of modules secured together to form the desired number of switching connections between tubular antenna lines A and tubular transmission lines T with each line being shielded by a channel shape structure having one set of channels forming passages shielding the antenna line and another set of channels forming passages shielding the transversely arranged transmission lines, each channel including a back or base B, a pair of webs W, W and inturned flanges F, F at the free edges of the webs. The channels of one group are secured by suitable means to the transversely arranged channels of the other group such as by bolts or other suitable fasteners 15. It will be evident that suitable insulators are provided for supporting the antenna and transmission lines from the channels.

One of the four switch modules has a base plate B with front webs W, W, W perpendicular to the base defining two channels for housing parts of the antenna lines A3 and A4 while rear webs W, W, W perpendicular to the base plate B and perpendicular to the front webs in cooperation with base B house transmission lines T3 and T4.

The switch plunger unit shown in detail in FIGURES 3 to 6 inclusive is the switch plunger unit located at the intersection of antenna line A4 and transmission line T3. The plunger switch unit is mounted for reciprocation through opening O through the base B with the edges of each opening O being reinforced by channel shaped strap members 16A, 16A running along the antenna lines A and strap members 16T, 16T on the other side of the base plate and running along the transmission lines T. Supported from the base B are antenna lines supporting insulators 17 secured by bolts passing through the base plate B through the strap 16T and through the fitting 17X. Insulators 17 support the antenna line sections A4, A4 in spaced relation to the base B and the webs W. Supported from the outer end of each insulator 17A is a conductive block 17Y having a pair of spring leaves 18, 18 on opposite sides of the block and projecting outwardly from the cooperating line section. Similar parts in the antenna and transmission line sections A and T are identified with the postscript A or T for specific identification and a further numerical postscript to indicate the line. The spring leaves have generally hemispherically shaped contacts 18B, 18B facing each other at their free ends. A bracing strut 18C of tubular rivet construction passing through apertures intermediate the ends of the spring leaves is secured by spinning into intimate binding relation maintaining the spring leaves 18, 18 in parallel relation. An insulator 17 and conductive block 17Y and the spring leaf contacts 18, 18 are provided on the ends of each line section of the antenna and transmission line sections for cooperation with a blade type contact 19 fixedly mounted on tapering insulators 20 fixedly secured by suitable bolts to one flat surface of a square cross-section tube 21 which passes through the associated opening O in the base and mounted for reciprocating while prevented against rotation.

A channel shape bar 22A is nonmovably mounted between the outer ends of adjacent webs W, W by means of a plate 22X welded to a flange F with the channel bar 22 being provided with a circular opening which slidingly receives the square tubular slide shaft 21. A pair of L-shaped members 22B, 22B having one leg of less inside length than the lateral dimension of the slide and the other leg of appreciably greater inside length than the transverse dimension of the slide is adujstably secured in position by machine screws 22C passing through enlarged openings in the bar 22 to provide adjustment of the angle members to accurately and snugly support the slide shaft for longitudinal movement while preventing turning thereof. The short leg of each angle member has a pair of screw threaded apertures cooperating with screws 22C to retain the guides 22B in position. The angle guide members 22B are made of aluminum with chromium plating thereon to reduce friction and wear. A similar channel shaped bar 22T is removably mounted on the adjacent webs W, W of the channel confining the cooperating transmission line T by means of a plate 22X welded to the flange FT and cooperating screws 22Y passing through apertures in bar 22T and threaded into threaded openings in plate 22X whereby the slide can be inserted from the transmission line side of the assembly and the bar 22T mounted in place to accurately guide the slide 21 at the front and back of the plunger switch unit. Suitable angle guide blocks 22B are also mounted on the bar 22T to provide proper guidance of the switch plunger unit.

Figure 2:
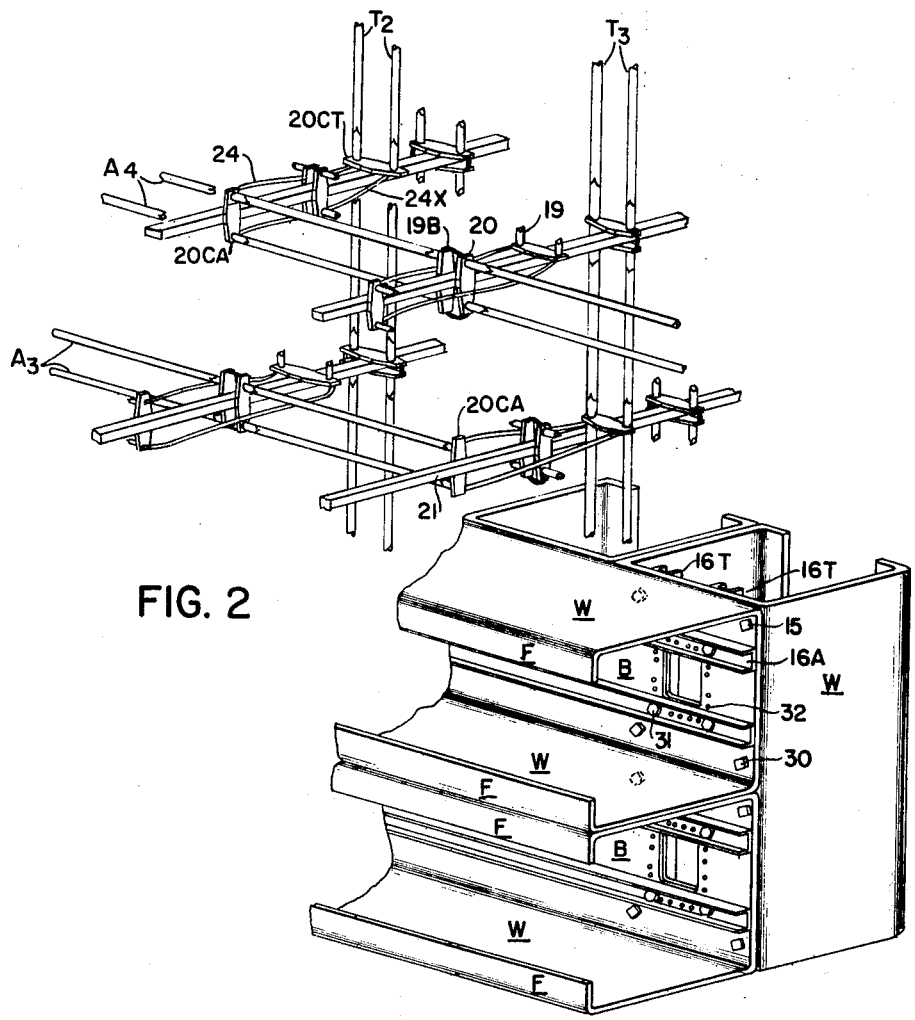
FIGURE 2 is an isometric schematic view with much of the supporting framework omitted showing the several switches in various positions of switching and fragmentarily showing the channel framework for supporting and shielding the switch system.

The switch plunger unit shown in FIGURES 3 to 6 inclusive illustrates the line continuing position between line A4 and line T3 which is diagrammatically shown in FIGURE 2.

The line continuing knife blade contacts 19 are mounted to project outwardly from opposed insulators 20, 20 tapering toward their ends and secured to the square tubular shaft 21 with a cushioning lead pad 23 having a pair of screw receiving apertures between the insulator 20 and the shaft 21 and two machine screws 23A, 23A passing through the insulator, the lead pad and the cooperating corona ring 23B each having a countersunk opening receiving the head of the flat headed machine screw 23A the shank of the screws being screwed into threaded apertures in the wall of tubular square shaft 21 thereby securely maintaining the insulator 20 in fixed position.

The pair of opposing insulators 20, 20 for lines A4 carries contacts 19 extending outwardly into the position for engaging semispherical convex contacts 18B, 18B thereby making an effective electrical connection. The knife shaped contact 19 has a threaded stud extending through a corresponding aperture in the insulator 20 and secured by a nut 19A with suitable lead washers and corona rings similar to that previously described and dead soft copper ribbon conductor 19B is clampingly held between the shoulder of the contact 19 and the lead washer thereneath so the contacts 19 and ribbon conductor 19B provide the line continuing switch elements for the balanced conductors A4, A4. It will be evident that similar spring contacts 18A, 18A and movable knife contacts 19 with ribbon conductors 19B provide for line continuing relation of cooperating conductors T3, T3. Similar parts are identified by the same reference numerals with a postscript of the corresponding line such as A4 or T3 to avoid unnecessarily increasing the number of reference characters.

To cross connect antenna line A4 to transmission line T3, for example, the switch shown in FIGURES 3 to 6 inclusive is pushed rearwardly so that contacts carried by insulator 20CA engage the line A4 while the insulator 20CT has its contacts 19 engaging with transmission line T3 with a conductor 24 connecting one contact of insulator 20CA to one contact of insulator 20CT and another conductor 24X connecting the other contact of insulator 20CA to the other contact of insulator 20CT thereby providing the cross over from the transmission line T3 to the antenna line A4.

It is important that no stub ends of the antenna or the transmission lines be connected to the source of power when the switch is in its cross switching position and this desired condition is obtained with the present inventon.

The switch plunger unit located at the intersection of T3 and A3 has its insulator 20CA on the opposite side of the plunger tube 21 from that shown with respect to the switch at T2, A4 and T3, A4 of FIGURES 3 to 6 inclusive. This arrangement provides for having the antenna leads extend from opposite edges of the switch assembly. The plunger switch unit may be modified so the transmission lines extend from opposite edges of the switch assembly and in an alternating manner, if desired.

Provision is made for complete shielding to avoid crosstalk between adjacent lines and to further improve the the avoidance of crosstalk, baffle plates 25, 25 are provided on each side of each transmission line at the emerging edge of the switch system. Transmission line T1, for example, is offset bringing the leads thereof near the front of the switch system while the leads T2 are offset bringing the leads near the rear of the switch assembly so the leads from T1 and T2 are approximately 45° offset as they emerge from baffles 25, 25 thereby minimizing crosstalk.

According to the present invention to reciprocate the plunger switch unit, a pair of struts 26, 26 fixed to bar 22A rotatably support a crank shaft 26A carrying an aluminum crank arm 26B fixed thereto at one end and having a cam in the form of a ball-bearing roller 26C rotatably mounted on a stub shaft fixed to the other or free end of aluminum crank 26B. The bearing surfaces throughout the system are plated with chromium assuring long life and minimizing friction. A cross head having a square shank 26D is secured by a bolt 26E passing through aligned apertures in shank 26D and square shaft 21 to shaft 21. The cross head includes a four-sided open top box follower 26F which receives the cam roller 26C whereby when the crank 26B is rotated from the full line continuing position of FIGURE 7 to the full line cross connection position of FIGURES 8 and 9 the switching is changed from the line continuing position shown in FIGURES 3 and 4 to 6 inclusive as illustrated at T3, A4 to the cross over position shown in FIGURES 8 to 10 inclusive and illustrated at T2, A4 in FIGURE 2.

The box crosshead follower 26F is provided with a bottom, side walls 26G, 26G and one end wall 26H with each side wall having a cutout receiving an angular end 26I of a detent spring secured by rivets to the cooperating side wall 26G with a reinforcing detent spring 26J providing additional force in the angular end 26I of the first detent spring. When the roller 26G is in the position shown in either switching position, the angular end 26I of each detent resiliently engages the roller 26C urging the roller 26C against the end wall 26H thereby retaining the crank arm 26B in position.

The crank shaft 26A has a square end 26K with the corners extending in the direction of the crank arm 26B and transverse thereto and such square end 26K receives a switch handle 26L having a square aperture which is substantially parallel to the front of the switch assembly in both positions of use minimizing space requirements, a pin 26M passing through an aperture in the square end 26K retaining the handle on the crankshaft.

Figure 3:
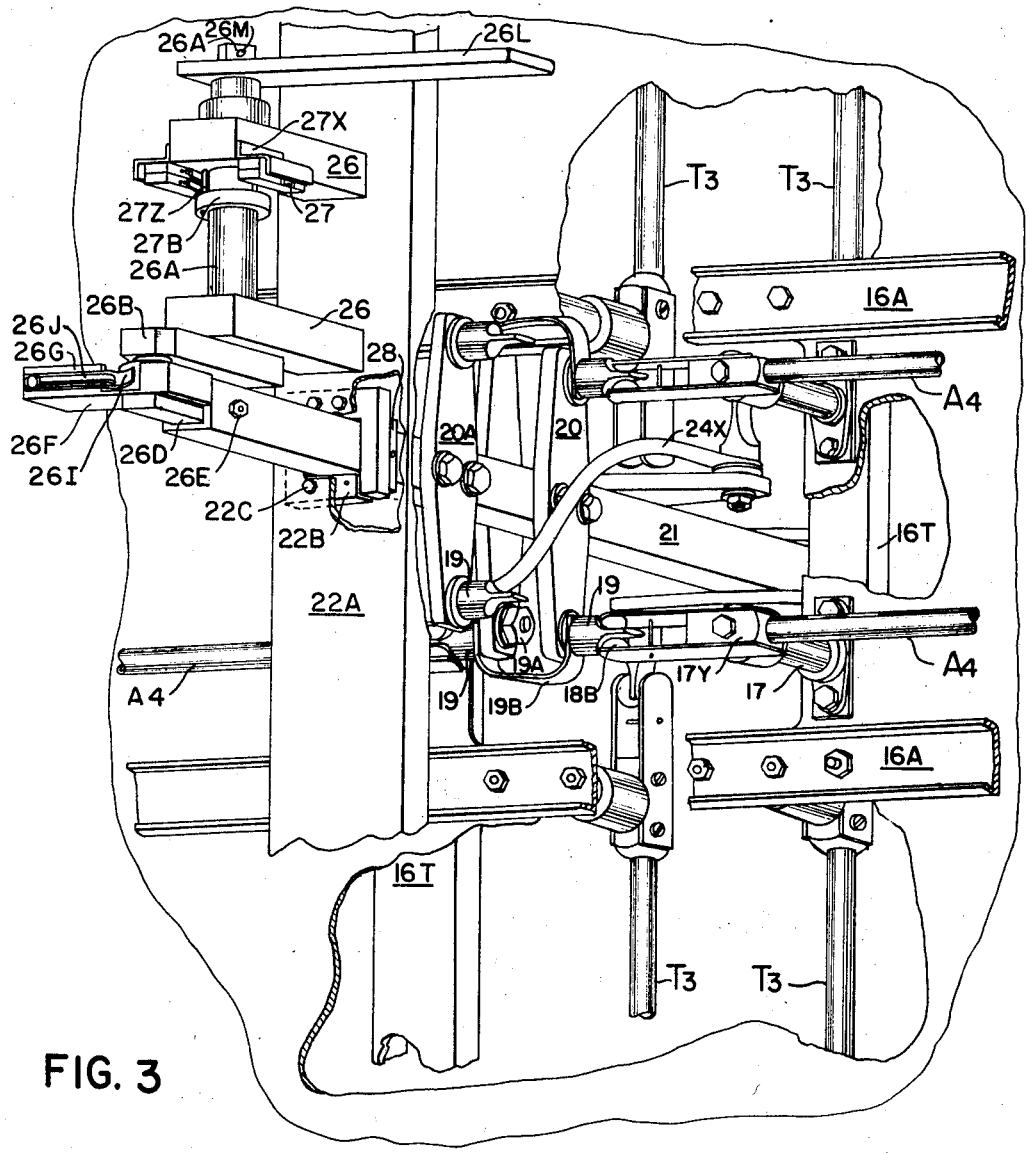
FIGURE 3 is a fragmentary view of one plunger switch unit and its operating mechanism in the line continuing position.
Figure 7:
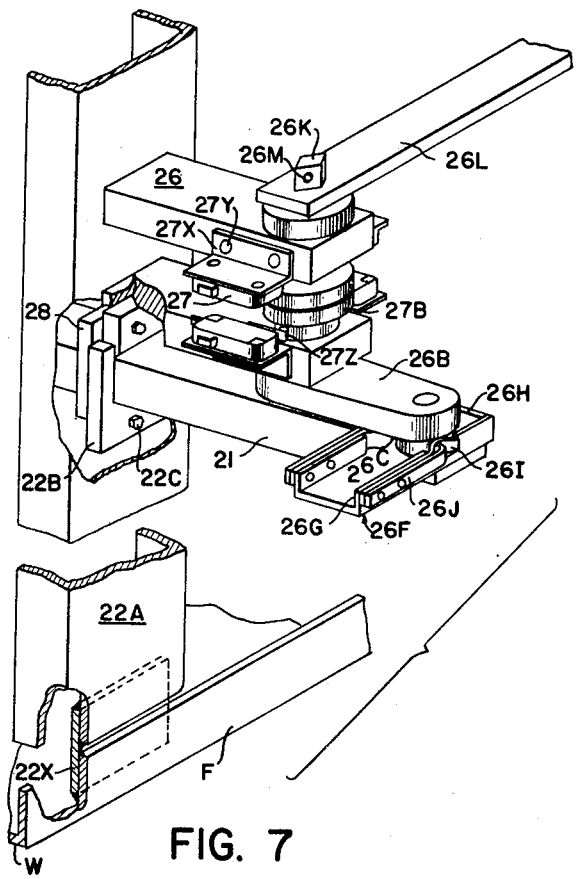
FIGURE 7 is an isometric view of the handle and crank mechanism and the forward bearing support for operating one of the switches and showing the cam operated microswitches for turning the power off and on prior to disconnection and after reconnection and showing the detents for retaining the plunger switch unit in both positions.
Figure 8:
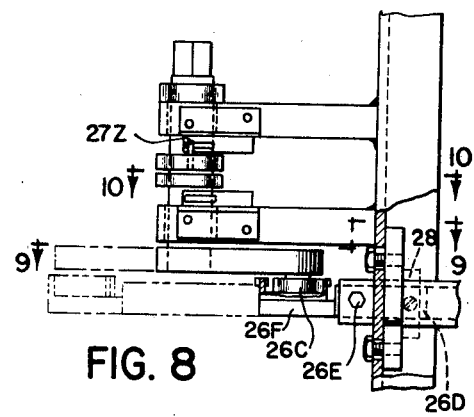
FIGURE 8 is a side elevation of the same.
Figure 9:
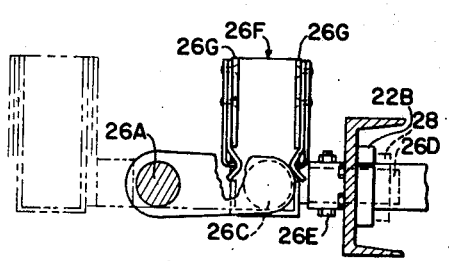
FIGURE 9 is a fragmentary section taken on line 9—9 of FIGURE 8 showing the operating mechanism in position to connect one of the multi-conductor horizontal power lines to one of the multi-conductor vertical load lines and in dotted lines showing the multi-line continuing position.
Figure 10:
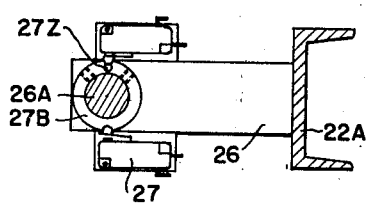
FIGURE 10 is a fragmentary section taken on line 10—10 of FIGURE 8 showing the cam operation of the microswitches with the background elements omitted.

A front collar 28 surrounding the square shaft 21 and fixed thereto by a screw serves as a stop limiting the forward motion of the plunger by abutment with the front guides 23B as shown in FIGS. 3 and 7 and in dotted lines in FIGS. 8 and 9 thereby positively limiting movement of the plunger in its line continuing direction. The sealed ball bearing roller 26C moves the plunger by engagement with the front side wall 26G and front detent 26I to its final line continuing position, the detent 26I also semi-positively retaining the shaft 26A and the plunger in operative position.

To move the plunger to cross connection position, the shaft 26A is rotated by its handle 26L causing front detent 26I to move outwardly before any change in the plunger position occurs and without the roller 26C contacting the rear detent 26I thereby avoiding friction. The roller 26C is of appreciably less diameter than the spacing between side walls 26G, 26G thereby providing for lost motion of the crank shaft 26A before any movement of the plunger can occur. The microswitches 27 are operated by the cooperating cam pins 27Z on adjustable collars 27B to turn off the power before any motion of the plunger occurs. After the power is turned off further rotation of the crank shaft 26A moves the plunger breaking the line continuing contacts and then making the cross connection contacts when the crank shaft is turned approximately a half revolution to the position shown in FIGURES 8 and 9. Before the final turning of the shaft 26A occurs, a second stop collar 28B fixed to the shaft 21 adjacent the rear engages the rear set of plunger guides 23B fixed to the rear guide channel 22T to assure that cross contacts make proper connection. The plunger is limited in its rearward movement by the rear stop 28B and the cross contacts are in positive engagement before the crank arm reaches its final position shown in FIGURES 8 and 9. During the last few degrees of movement of roller 26C past the rear detent 26I the microswitches 27 operate to turn on the power only after the cross contacts are in positive engagement thereby avoiding arcing.

According to the present invention the initial and final lost motion of the switch operating lever 26L and the crank results in turning off the power before the plunger contacts are moved and provides for turning on the power only after the contacts are in positive engagement and substantially in their final position. The crank arrangement provides for great mechanical advantage at the initial and final movement of the plunger and rapid movement between the initial and final movements.

The switch system is made in repeating modules and as illustrated in FIGURE 2 each module includes the projected area of the crossing channels each channel having a back B, webs W, W, and flanges F, F with the cooperating channels being secured together by bolts 30 passing through aligned apertures adjacent the web of each channel. When the channels are of relatively light weight material the reinforcing channel shaped straps 16A, 16A in the antenna channel and channel shaped straps 16T, 16T in the transmission channels are bolted together where the channels intersect by bolts 31 adjacent each corner of the opening O. Additional bolt receiving apertures 32 registering with one another are adapted to receive the bolts supporting the insulators 17A in their proper positions by means of the securing bolts 32A which pass through the attaching flanges 17F and through suitable spacers to maintain the conductive block 17Y and leaf spring contacts 18B in proper position. The insulator 17 is received in a tubular cup in the flange 17F and secured by cement or the like thereto while a cup 17G surrounds the upper portion of the insulator 17 being secured thereto by cement and having a threaded aperture through the bottom which receives the attaching screw 17H for the block 17Y.

The block 17Y is of rectangular section with a bore running the length thereof and a counter bore receiving the adjacent tubular conductor A4, for example, which is secured thereto by silver solder, the conductors being copper tubes with silver plating on the exterior and the other conductive parts being similarly silver plated to improve the surface conductivity thereof. Attaching screws 17I secure the spring leaves 18 to the block 17Y while the tubular rivet 18C maintains the parallel relation between the spring leaves 18, 18.

In assembling the switch structure, a plunger switch unit including the tubular square shaft 21 is inserted from the rear with the crosshead removed and thereafter the rear channel bar 22T is bolted in place providing the support for the plunger unit. Thereafter, the angular guide members 22B are adjusted to properly align the knife contacts 19 with the cooperating hemispherical shaped convex contacts 18B and the guides are bolted in place on their respective bars 22A at the front and 22T at the rear. The cover plates 33 are then applied thereby completely enclosing the antenna lines and the transmission lines. The crosshead with its box type follower is then bolted to the shaft 21 by the bolt 26E with the roller cam 26C in the box thereby providing for the reciprocation of the plunger switch unit. Baffles 25 should adjacent transmission line leads and the leads being bent to provide a 45° offset where the leads emerge from the baffles 25.

Another form of channel has the cover plate mounting flanges extending outwardly with inwardly extending rib flanges 34 positioned on each web to support a cross piece 34B having an insulator receiving cup carrying an insulator 34C which in turn carries a conductor 120 secured to the insulator by a screw 34X. The cross piece 34B is secured to flanges 34 by bolts 34E passing through aligned apertures therethrough. The channels are arranged in crossing relation to provide the necessary number of shielded antenna and transmission lines whether a single conductor is used in a manner described in Patent 3,223,812 or multiconductor lines are used and mounted in a manner above described. Suitable switching is provided and suitable cover plates and operating mechanism as well as well as microswitches to indicate the position of the plunger switch units and turn off the current to the load prior to making and breaking contact. The channels are connected together by bolts 30 or other suitable means as previously described.

Figure 11:
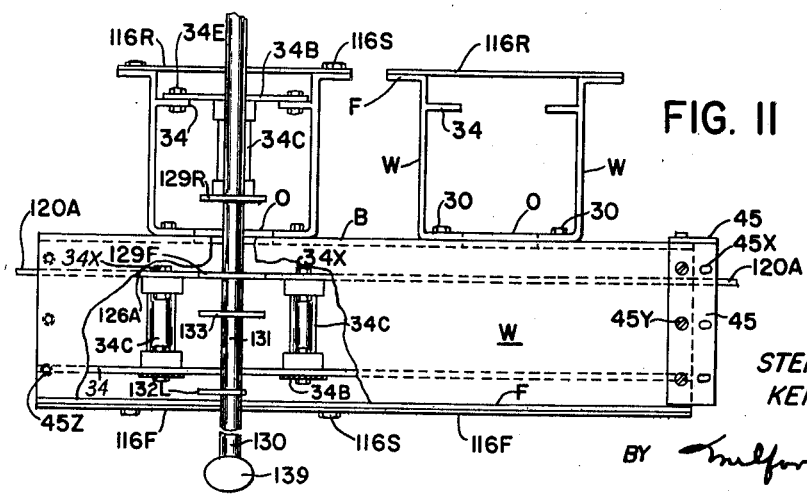
FIGURE 11 is a plan view of another form of switch system using outwardly flanged channels having intermediate inwardly extending ribs providing the supporting structure.

Referring more particularly to FIG. 11, a single line conductor and a plunger switch shown in FIG. 2 in Patent 3,223,812 is included with corresponding reference numerals of similar parts in the 100 series. The operating shaft 130 of the plunger passes through openings O in the back of the channels with the antenna line continuing contact 129F and the transmitter line continuing contact 129R being shown in line continuing positions. A cross connecting tubular element 131 carrying the cross connecting transmission line contact 133 and also carrying a cross-connection antenna line contact 132L connects the crossing antenna line 120A to transmitter line 120T when the plunger 130 is moved to its rear position.

Front cover plates 116F mounted on the antenna line channel and rear cover plates 116R on the transmission line channel complete the enclosure, thereby completely shielding the conductors 120A and 120T. The cover plates also serve as bearings for the plunger shaft 130.

The structure of FIG. 11 can be made in modules connected by conductive connecting plates having elongated bolt receiving apertures 45X receiving bolts 45Y threaded into threaded apertures 45Z to provide for making switching systems of any desired size. The modules may be made for a single switch and the system built up therefrom.

Connecting plates 46 are provided between the modules of FIGS. 1 and 12 and secured to the bottoms and webs of the channels by bolts 46X to provide effective connection between the modules and also to provide the proper surface conductivity of the channels housing the lines. Similar connection plates are used for the transmission and antenna line housing channels.

Referring to FIG. 12, the switch system is shown in a horizontal position with the front of FIG. 1 down and supported on posts 40 supporting beams 41 and stringers 42 providing an overhead support for the switching system for ease of access and operation to each switch with a substantially clear floor space therebeneath. The switch system may also be suspended from the ceiling. This figure also shows the baffles for the transmission leads extending from one end with the adjacent leads positioned 45° apart. The antenna lines are staggered and baffles therefor are omitted, but the antenna leads could extend from the same side and suitable baffles provided similar to those of the transmission leads to minimize cross talk.

The material for the channels and covers is shown as being of aluminum and the bearing surfaces of the guides 22B and the contacting surfaces of the square shaft 21 are preferably chromium plated to minimize friction. Although the plunger shaft 21 is shown as being square aluminum tube, it may be of insulating material suitably reinforced with a metal core or the like and the structure is designed to provide the proper electrical characteristics with a minimum of cross talk. The conductive lines and copper tubes are silver plated. The electrical contacts and contact blocks are of brass silver plated, and the springs are silver plated bronze. The insulators are of ceramic and it will be apparent suitable material is chosen for all the elements.

The invention, therefore, provides an effective switching system for connecting any line of a high frequency transmitter to any line of an antenna with rapid switch plunger movement between the initial and final positions.

It will be apparent that changes may be made within the practice of the invention as defined by the valid scope of the claims.

What is claimed is:
1. A switch system comprising a first series of lines of conductor line sections extending in one direction, a second series of lines of conductor line sections extending transversely to said first series and transversely to said first and second series, a plurality of plungers extending transversely to said lines, each plunger having a set of line continuing contacts for cooperation with adjacent line sections of one line in one position of the plunger, each plunger having a set of cross connecting contacts for cross connection between one line section of one series and an adjacent line section of one line of the other series, operating means to move each plunger from line continuing position to cross connecting position, said operating means providing lost motion connection between said plunger and the operating means whereby said operating means can move a limited extent without breaking the engaged set of operative contacts, microswitches operated by said operating means during said lost motion prior to disconnection or connection of said sets of contacts for interrupting and restoring power to said one lines before break of the operative set of contacts and after make of the other set of contacts.

2. Mechanism for operating a switch comprising a member mounted for oscillating movement for moving a switch from one position to another position, a follower engaging box having an open top mounted on said oscillating member transverse to the movement thereof, a shaft extending transversely to said box follower and said oscillating member, a crank arm mounted on said shaft, a cam mounted on the free end of said crank arm for movement along said box follower upon rotation of said shaft whereby said oscillating member will be moved in the direction of oscillation upon rotation of said shaft, means to rotate said shaft whereby said oscillating member may be moved from one position to another.

3. The invention according to claim 2 in which the box has a closed end and the cam is a roller of less diameter than the spacing between the transverse walls of said box and abuts the end of said box limiting movement.

4. The invention according to claim 3 in which the oscillating member moves in a straight line and resilient detent means are provided on the box follower engageable with said cam, and abutment means are provided for limiting movement of said oscillating member.

5. The invention according to claim 2 in which load carrying contacts providing a switch are mounted on said oscillating member, microswitch means are provided and additional cam means are provided on said shaft for operating said microswitch means for connecting and disconnecting a source and load ot said load carrying contacts at either limit of movement.

References Cited
UNITED STATES PATENTS

| | | | |
|---|---|---|---|
| 1,363,365 | 12/1960 | Slough | 200—175 |
| 1,523,407 | 1/1925 | Dobbin | 200—175 |
| 3,215,954 | 11/1965 | Stevens | 200—153.18 XR |
| 3,223,812 | 12/1965 | Wright et al. | 200—153.18 |
| 3,387,108 | 6/1968 | Reimer | 200—175 |
| 1,244,110 | 10/1917 | McNary | 200—18 |

FOREIGN PATENTS 805,684  12/1958  Great Britain.

ROBERT K. SCHAEFER, Primary Examiner
ROBERT A. VANDERHYE, Assistant Examiner

U.S. Cl. X.R.
200—153, 175